(12) United States Patent
Salutzki

(10) Patent No.: US 7,815,023 B2
(45) Date of Patent: Oct. 19, 2010

(54) DRIVE DEVICE FOR OPENING OR CLOSING A DOOR OR SIMILAR

(75) Inventor: Thomas Salutzki, Witten (DE)

(73) Assignee: Dorma GmbH + Co. KG, Ennepetal (DE)

( * ) Notice: Subject to any disclaimer, the term of this patent is extended or adjusted under 35 U.S.C. 154(b) by 1367 days.

(21) Appl. No.: 10/518,702

(22) PCT Filed: Jun. 24, 2003

(86) PCT No.: PCT/EP03/06619

§ 371 (c)(1),
(2), (4) Date: Dec. 20, 2004

(87) PCT Pub. No.: WO2004/003076

PCT Pub. Date: Jan. 8, 2004

(65) Prior Publication Data

US 2006/0070467 A1 Apr. 6, 2006

(30) Foreign Application Priority Data

Jun. 27, 2002 (DE) ................. 102 28 870

(51) Int. Cl.
*F16F 9/00* (2006.01)
*E05F 3/10* (2006.01)

(52) U.S. Cl. ............... 188/322.22; 16/52; 16/58; 16/62

(58) Field of Classification Search ......... 188/285, 188/286, 322.19, 322.22; 16/52, 53, 58, 16/62
See application file for complete search history.

(56) References Cited

U.S. PATENT DOCUMENTS

| | | | | |
|---|---|---|---|---|
| 4,019,220 A | * | 4/1977 | Lieberman | 16/62 |
| 5,187,835 A | * | 2/1993 | Lee | 16/52 |
| 5,535,514 A | * | 7/1996 | Lucas | 188/285 |
| 6,077,908 A | * | 6/2000 | Yahiro | 525/218 |
| 6,412,224 B1 | | 7/2002 | Feucht et al. | |
| 6,618,899 B1 | | 9/2003 | Ginzel et al. | |

FOREIGN PATENT DOCUMENTS

| | | |
|---|---|---|
| EP | 0 562 465 | 9/1993 |
| GB | 912 121 | 12/1962 |
| WO | WO 0036255 A2 * | 6/2000 |

* cited by examiner

*Primary Examiner*—Thomas J Williams
(74) *Attorney, Agent, or Firm*—Cohen Pontani Lieberman & Pavane LLP

(57) ABSTRACT

A drive device for opening or closing a leaf of a door, a window or similar includes a housing and a closing spring, which is located in the housing and acts upon a piston, the latter co-operating with a closing shaft in the housing by means of gearing, The piston and housing are made of injection molded polyoxymethylene plastic (POM).

2 Claims, 1 Drawing Sheet

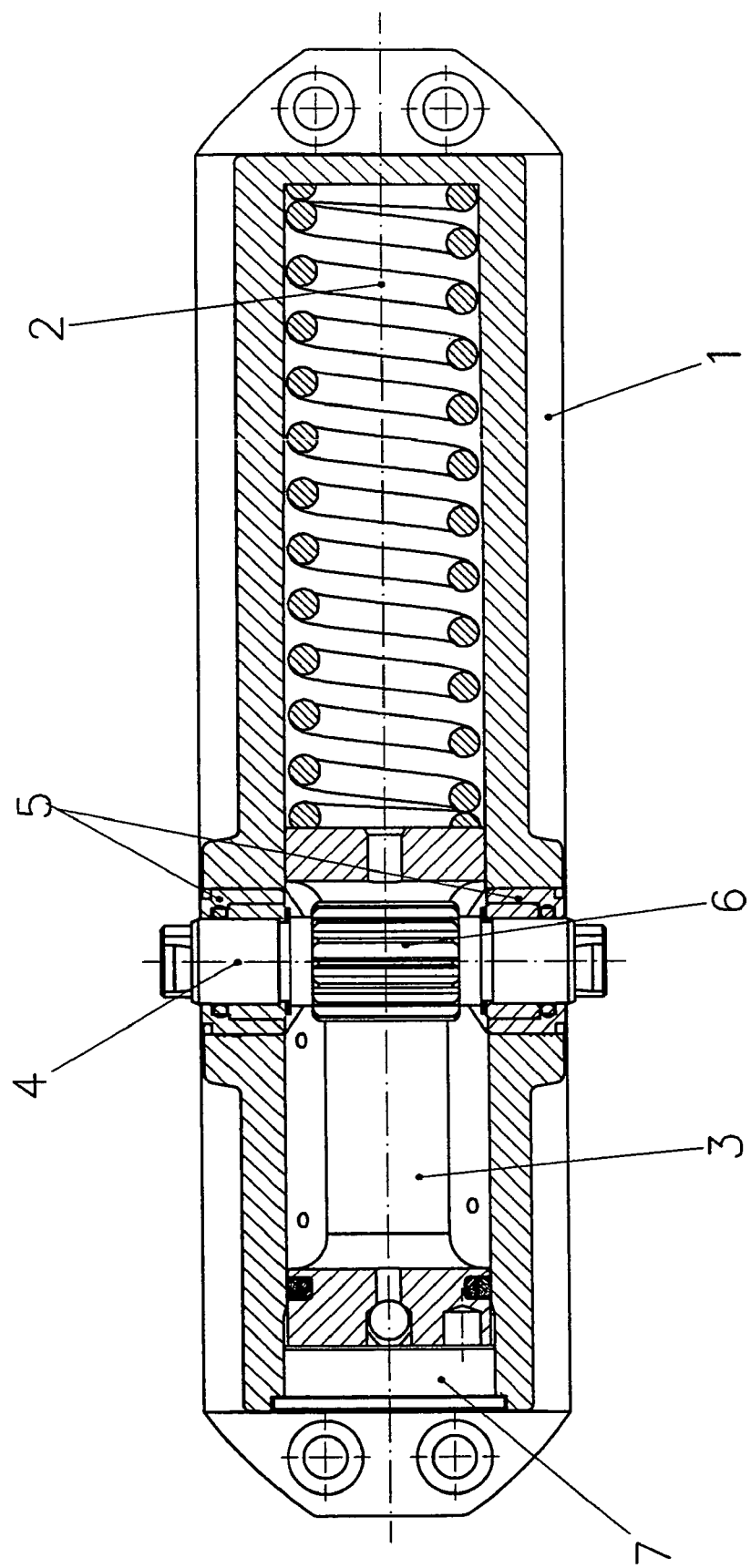

DRIVE DEVICE FOR OPENING OR CLOSING A DOOR OR SIMILAR

PRIORITY CLAIM

This is a U.S. national stage of application No. PCT/EP2003/06619, filed on 24 Jun. 2003. Priority under 35 U.S.C. §119(a) and 35 U.S.C. §365(b) is claimed from German Application No. 102 28 870.4, filed 27 Jun. 2002.

BACKGROUND OF THE INVENTION

1. Field of the Invention

The invention pertains to a drive device for opening or closing the leaf of a door or window or the like with a housing and with a closing spring installed in the housing, which spring acts on a piston, which is in working connection by way of gear teeth with a closing shaft supported in the housing.

2. Description of the Related Art

A drive device of this type is known from U.S. Pat. No. 6,412,224, the disclosure of which is incorporated herein by reference. This known drive device calls for improvement, especially with respect to the materials from which the individual parts are made.

SUMMARY OF THE INVENTION

It is therefore the task of the present invention to improve a drive device of the previously described type with respect to its production costs.

This is accomplished in the case of a drive device with the features indicated above in that essentially the piston and the housing are made of the plastic polyoxymethylene (POM).

Because of its properties, this plastic is especially suitable as a material for the piston and the housing, in that polyoxymethylene (POM) is very rigid and very hard. It also has a high restoring force, high deflection temperature, high abrasion resistance, favorable sliding behavior, and low wear. In addition, polyoxymethylene (POM) is not harmful to the health and is compatible with various types of hydraulic damping media.

The piston and the housing are preferably produced by injection-molding, because this production method guarantees that the parts can be obtained in large runs with accuracy, precision, and low cost.

So that the gear teeth on the piston can cooperate with the pinion on the closing shaft with the least possible amount of wear, it is provided in accordance with an inventive elaboration that the set of teeth on the piston are in the form of an inlay of metal, preferably steel, which is embedded in the piston, the plastic preferably being injected around them.

In accordance with an advantageous embodiment, the bearing shells of the closing shaft are also produced out of the plastic polyoxymethylene (POM).

In accordance with an inventive elaboration, these bearing shells are pressed into the housing and/or ultrasonically welded to it, for example, so that the good seating of the closing shaft in the housing can be guaranteed.

A recess for accepting the closing spring and the piston is provided in the housing. This recess is sealed by an end plug. In accordance with a preferred embodiment, this end plug consists of the plastic polyoxymethylene (POM).

In accordance with an advantageous elaboration, the embodiment described above offers the advantage that the end plug can be pressed into the housing and/or welded to it, preferably by ultrasound.

When, in accordance with a preferred embodiment, hydraulic control bores are provided in the housing and the outlets of these bores are sealed from the outside of the housing by pressed-in or ultrasonically welded or adhesively bonded plugs, which are made of the plastic polyoxymethylene (POM), the control bores in the housing can be produced during the same process as that by which the housing itself is produced.

Additional features and advantages of the invention can be derived from the following description of a preferred exemplary embodiment.

BRIEF DESCRIPTION OF THE DRAWINGS

The single FIGURE shows a longitudinal section through a drive device for opening and closing the leaf of a door or of a window, etc.

DETAILED DESCRIPTION OF THE PRESENTLY PREFERRED EMBODIMENTS

The function of a drive device of this type is generally known and is therefore not explained in detail below.

The drive device has a tubular housing 1, which has a recess, which extends in the longitudinal direction of the housing 1 and is open at one end. A closing spring 2, which acts on a sliding piston 3, is supported in this recess. The piston 3 and the housing 1 consist of the plastic polyoxymethylene (POM) and are preferably produced by injection-molding.

A closing shaft 4 is also supported in the housing 1 by bearing shells 5, so that the shaft is transverse to the longitudinal dimension of the housing. These bearing shells 5 consist of the plastic polyoxymethylene (POM) and are pressed into the housing 1 and/or welded to it by means of, for example, ultrasound.

The piston 3 is provided with a toothed rack which meshes with a pinion 6 on the closing shaft 4. This has the result that a displacement of the piston 3 in the longitudinal direction of the housing 1 produces a rotational movement of the closing shaft 4.

The rack on the piston 3 is preferably formed as an inlay of metal, e.g., steel. This inlay is embedded in the plastic during the injection-molding of the piston 3.

The recess provided in the housing 1, which extends in the longitudinal direction of the housing 1 and which is open at one end, is sealed at its open end by an end plug 7. This end plug 7 consists of the plastic polyoxymethylene (POM) and is preferably pressed into the housing 1 and/or welded to it, preferably by means of ultrasound.

To damp the movement of the piston 3 in the housing 1, hydraulic control bores (not shown here) are cast into the housing 1 during its production. The outlets of these control bores from the housing 1 can be sealed by pressed-in and/or ultrasonically welded or adhesively bonded plugs, which are made of the plastic polyoxymethylene (POM).

The preceding description of the exemplary embodiment of the present invention serves only to illustrate the invention, not to limit it. Various changes and modifications are possible within the area covered by the invention without abandoning the scope of the invention or its equivalents.

What is claimed is:

1. An apparatus for opening and closing a door leaf, the apparatus comprising:
   a housing made of polyoxymethylene plastic, the housing having a recess;

a piston made of polyoxymethylene plastic, the piston having a toothed rack and being arranged for movement in the recess;

a closing shaft comprising a pinion which engages the rack to drive the piston in the recess; and a closing spring arranged in the recess acting on the piston oppositely to the closing shaft;

wherein the toothed rack is made of metal and is embedded in the piston by molding the polyoxymethylene plastic around the rack so that the rack and the piston form a one-piece element; and wherein the housing is fitted with bearing shells which support the closing shaft, the bearing shells being made of polyoxymethylene plastic, wherein the bearing shells being press fit into the housing and welded to the housing by ultrasonic welding.

2. An apparatus for opening and closing a door leaf, the apparatus comprising:

a housing made of polyoxymethylene plastic, the housing having a recess which includes an open end, a piston made of polyoxymethylene plastic, the piston having a toothed rack and being arranged for movement in the recess;

a closing shaft comprising a pinion which engages the rack to drive the piston in the recess;

a closing spring arranged in the recess acting on the piston oppositely to the closing shaft; and an end plug which seals the open end of the recess;

wherein the toothed rack is made of metal and is embedded in the piston by molding the polyoxymethylene plastic around the rack so that the rack and the piston form a one-piece element;

wherein the end plug is made of polyoxymethylene plastic and is pressed into the housing and welded to the housing by ultrasonic welding.

* * * * *